(12) United States Patent
Friedman

(10) Patent No.: US 10,640,279 B2
(45) Date of Patent: May 5, 2020

(54) CONTAINER ASSEMBLY WITH SYRINGE

(71) Applicant: Veritiv Operating Company, Atlanta, GA (US)

(72) Inventor: Alberto Friedman, Dacula, GA (US)

(73) Assignee: VERITIV OPERATING COMPANY, Atlanta, GA (US)

( * ) Notice: Subject to any disclaimer, the term of this patent is extended or adjusted under 35 U.S.C. 154(b) by 0 days.

(21) Appl. No.: 16/052,248

(22) Filed: Aug. 1, 2018

(65) Prior Publication Data
US 2020/0039728 A1 Feb. 6, 2020

(51) Int. Cl.
*B65D 83/00* (2006.01)
*B65D 25/56* (2006.01)

(52) U.S. Cl.
CPC ......... *B65D 83/0022* (2013.01); *B65D 25/56* (2013.01)

(58) Field of Classification Search
CPC ............ B65D 83/0027; B65D 83/0022; B65D 47/12; B65D 41/26; A61J 1/2096; B01L 3/0282; G01F 11/023; B65B 3/003; A61M 5/1782
USPC ........................................ 222/49; 141/22–23
See application file for complete search history.

(56) References Cited

U.S. PATENT DOCUMENTS

| | | | |
|---|---|---|---|
| 14,525 A | 3/1856 | Stull | |
| 1,453,445 A | 2/1922 | Covell | |
| 1,422,778 A | 7/1922 | Petcher | |
| 1,898,435 A * | 2/1933 | Fillauer | B01L 3/0282 422/28 |
| 2,129,144 A | 9/1937 | Lancaster | |
| 2,845,963 A | 8/1956 | Zackheim | |
| 3,094,245 A | 6/1963 | Mizuno | |
| 3,168,913 A | 2/1965 | Eagles | |
| 3,767,088 A * | 10/1973 | Deussen | B65D 41/26 222/205 |
| 3,783,996 A | 1/1974 | Gerard et al. | |
| 3,881,624 A * | 5/1975 | Dougherty, Sr. | B65D 50/046 141/24 |
| 4,175,597 A | 11/1979 | Peterson | |
| 4,579,153 A * | 4/1986 | Goncalves | B01L 3/0282 141/23 |
| 4,936,490 A | 6/1990 | Battegazzore | |
| 5,031,802 A | 7/1991 | Joulia | |
| 5,279,582 A | 1/1994 | Davison et al. | |
| 5,531,710 A | 7/1996 | Dang et al. | |
| 5,598,939 A | 2/1997 | Watson et al. | |
| 5,746,349 A | 5/1998 | Putteman et al. | |
| 5,836,359 A | 11/1998 | Seidler | |
| 5,992,657 A | 11/1999 | Friedman | |
| 6,045,003 A * | 4/2000 | Seidler | B01L 3/0224 141/23 |
| 6,250,504 B1 * | 6/2001 | Maffei | A61J 1/2096 141/381 |

(Continued)

*Primary Examiner* — Paul R Durand
*Assistant Examiner* — Robert K Nichols, II
(74) *Attorney, Agent, or Firm* — Thomas B. McGurk

(57) ABSTRACT

A container assembly comprising a container with a container neck, a syringe, and a closure with a cap portion having an end wall, wherein the syringe plunger of the syringe is connected to the end wall. The syringe is enclosed by the container body and the cap portion when the cap portion is aligned in a closed position on the container. The syringe is removable from the container when the cap portion is in the open position.

22 Claims, 14 Drawing Sheets

(56) References Cited

U.S. PATENT DOCUMENTS

| | | | |
|---|---|---|---|
| 6,273,152 B1 * | 8/2001 | Buehler | A61M 5/1782 |
| | | | 141/22 |
| 7,398,900 B2 | 7/2008 | Friedman | |
| 9,155,680 B2 | 10/2015 | Mathys et al. | |
| 9,234,781 B2 * | 1/2016 | Lee | B65D 41/56 |
| 9,248,077 B1 | 2/2016 | Kelly et al. | |
| 9,474,863 B2 | 10/2016 | Hyun et al. | |
| 9,821,119 B2 | 11/2017 | Felsovalyi | |

* cited by examiner

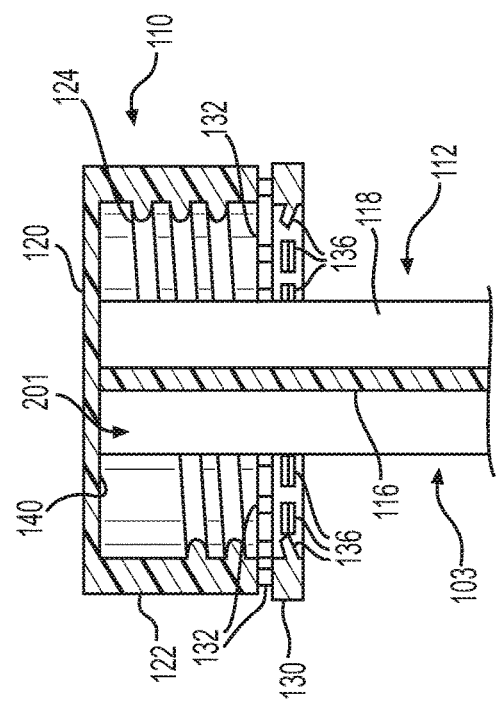
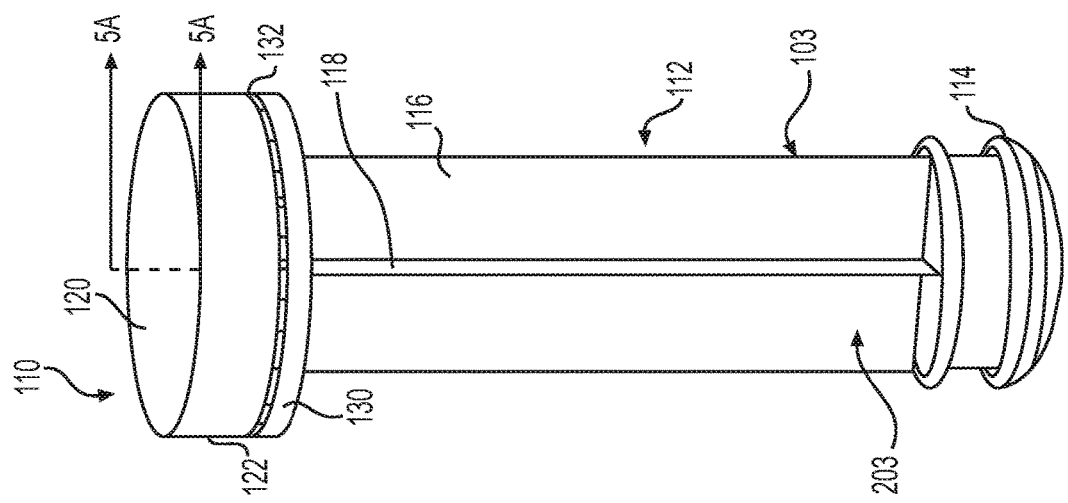

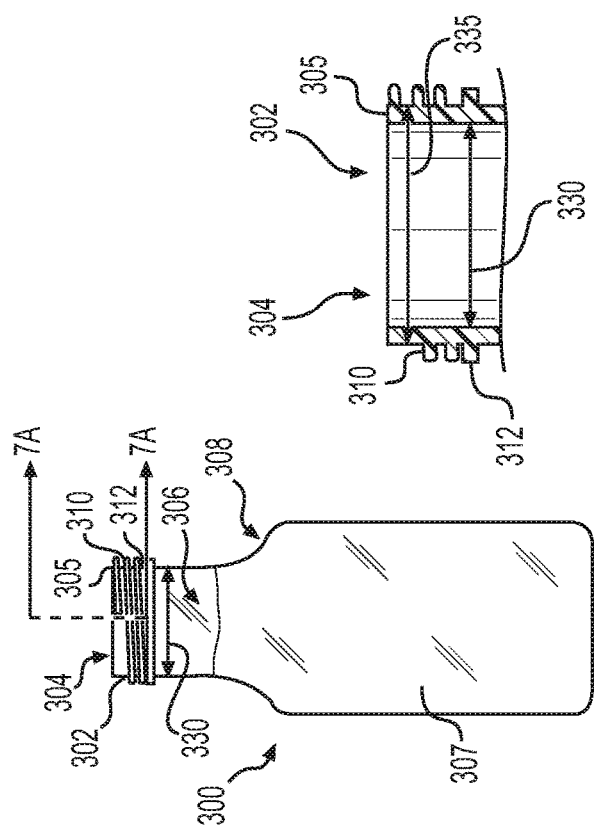
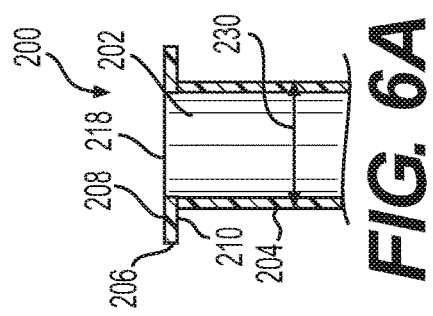
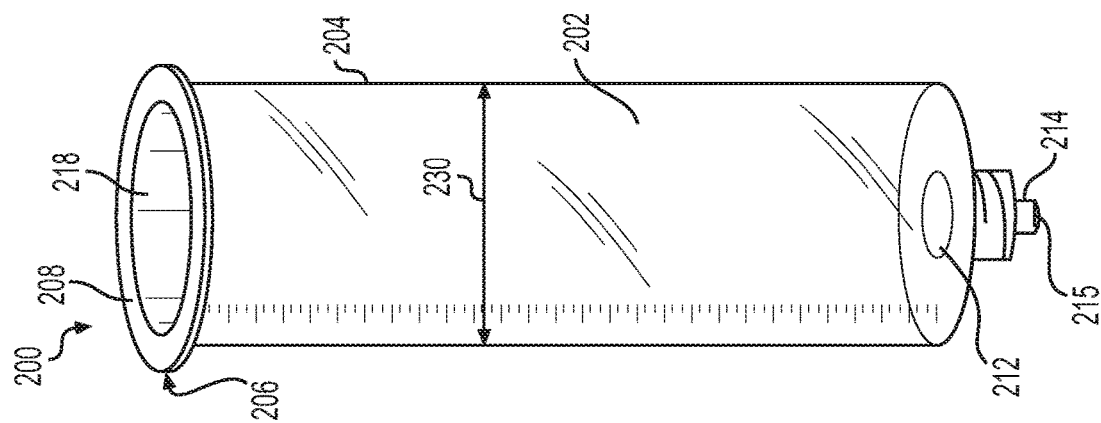

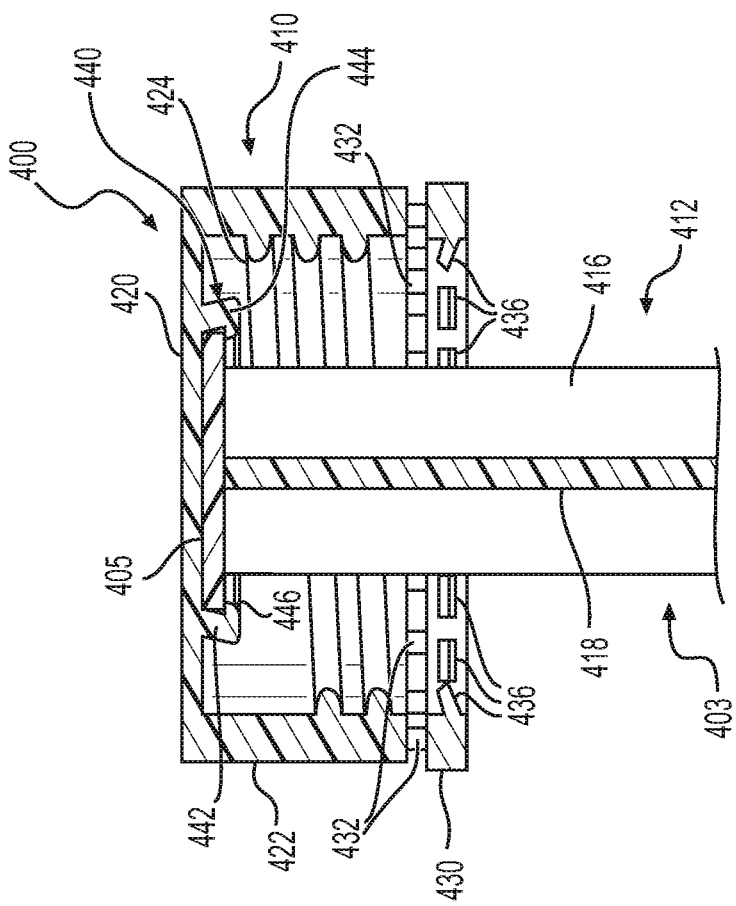
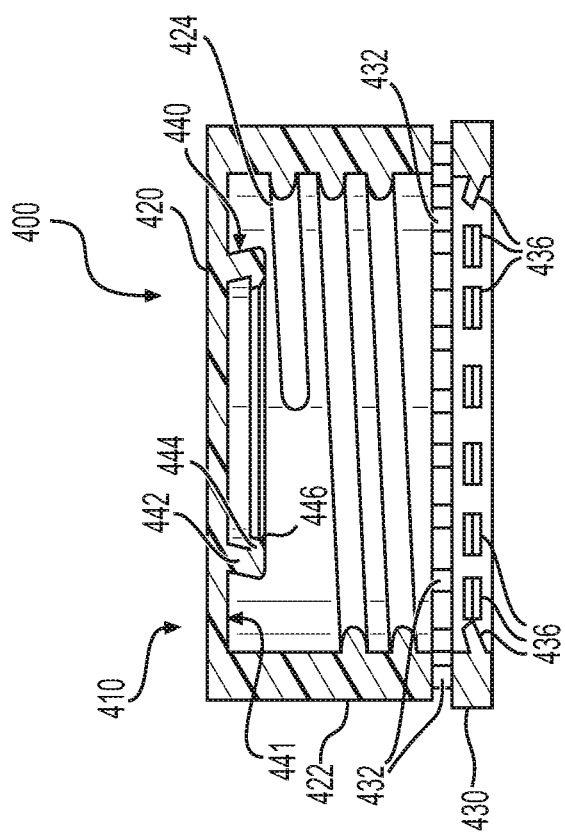

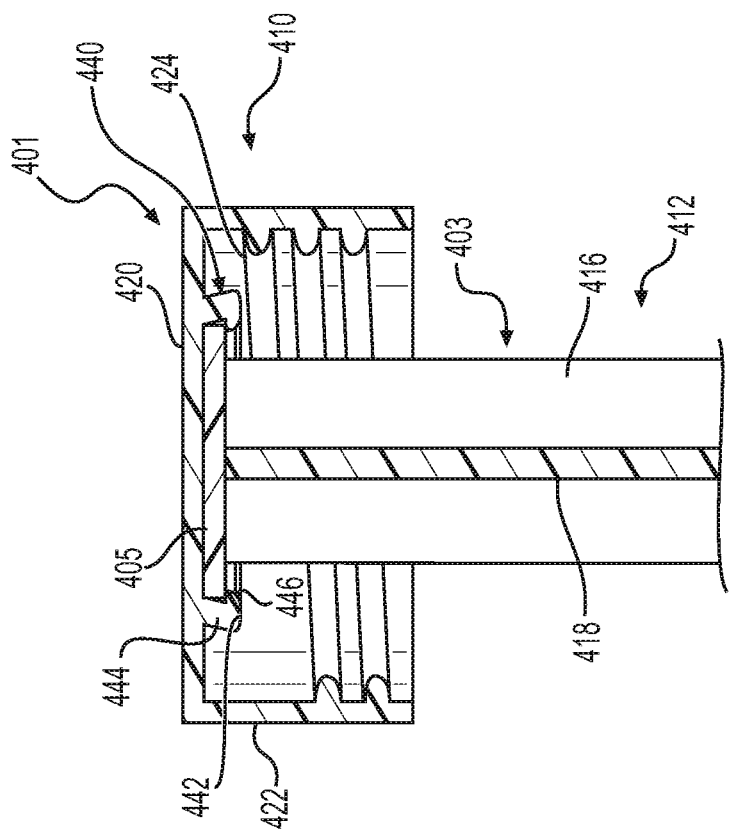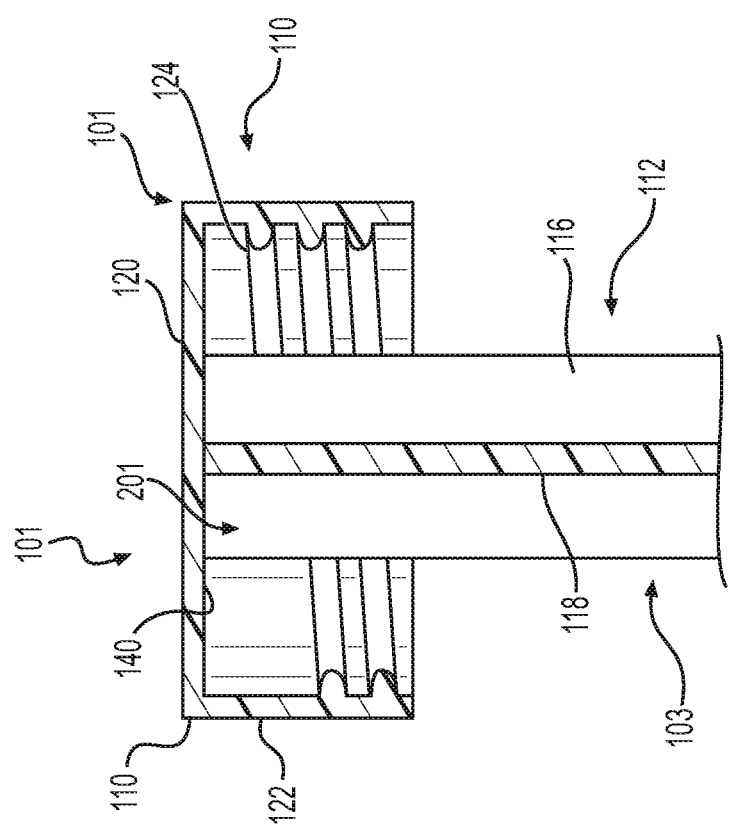

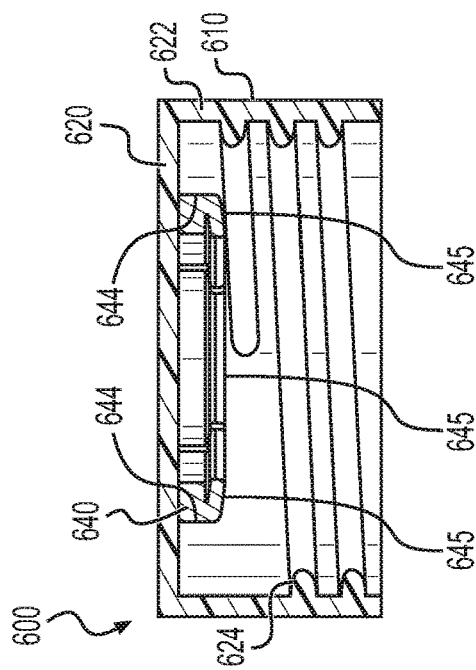
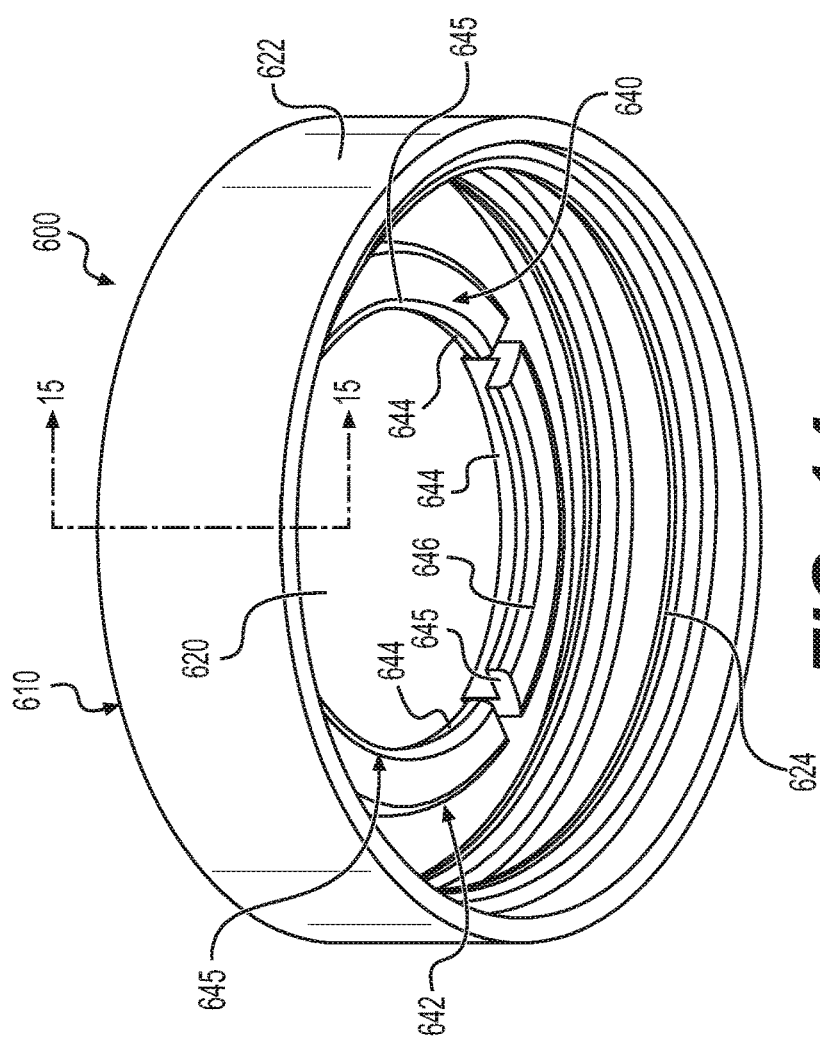

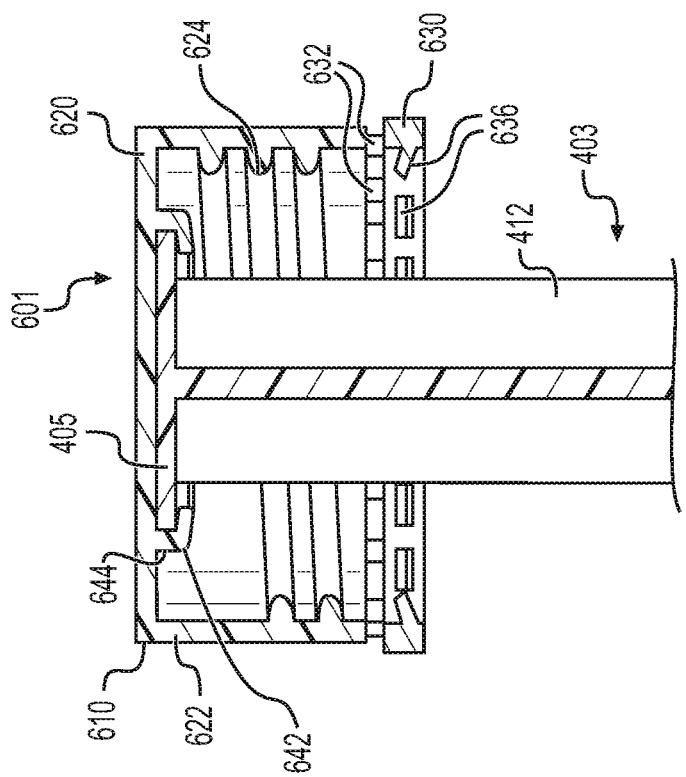
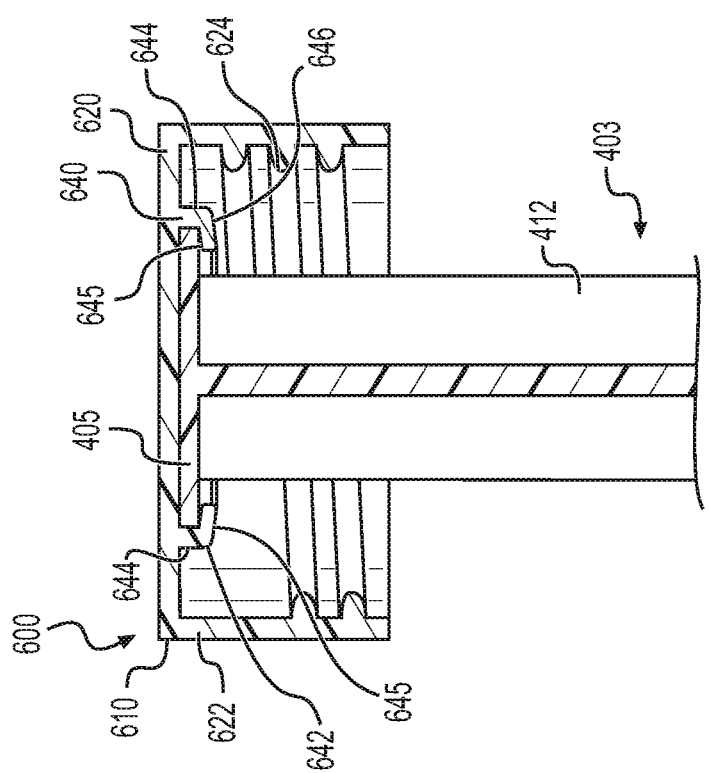

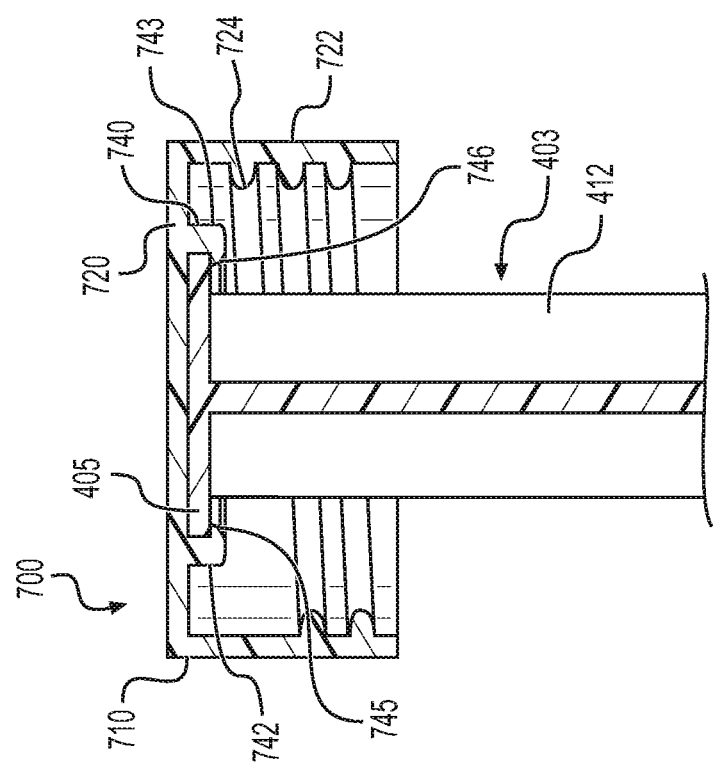
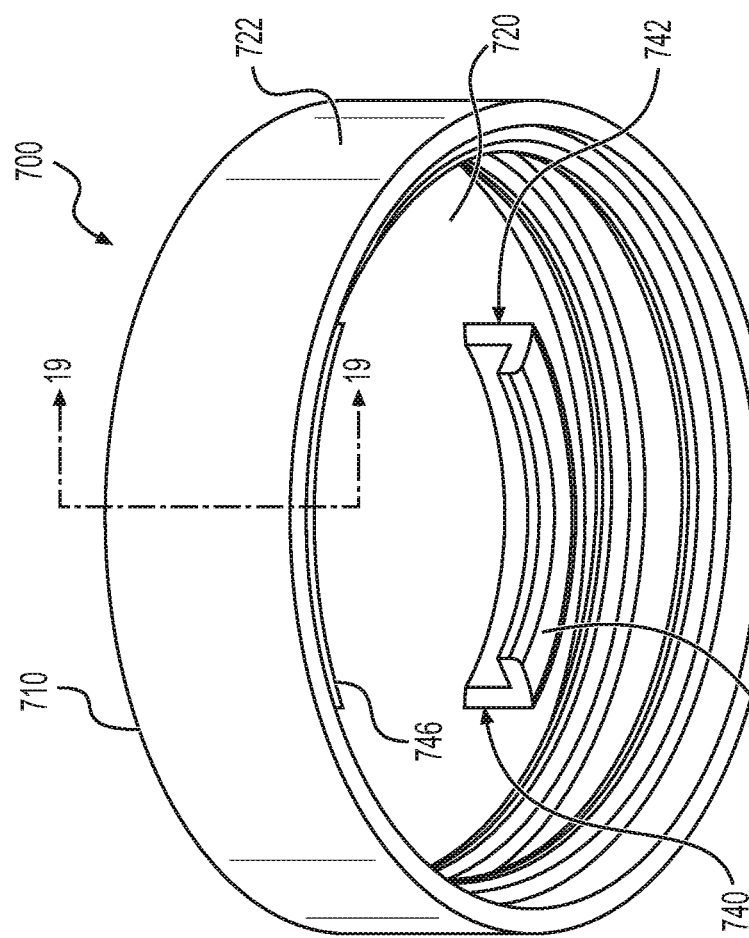

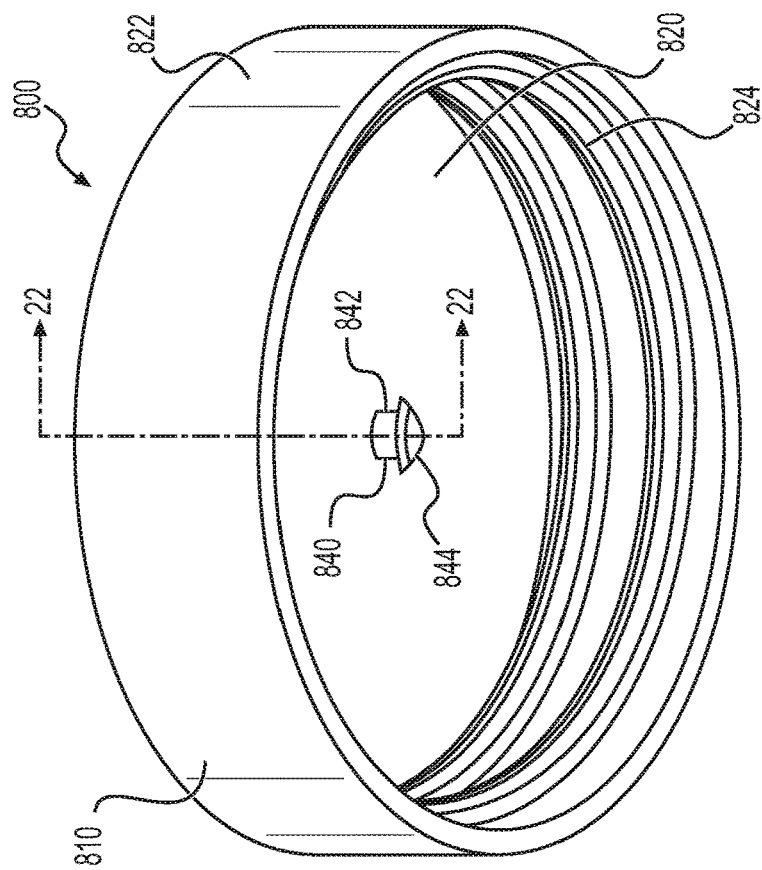
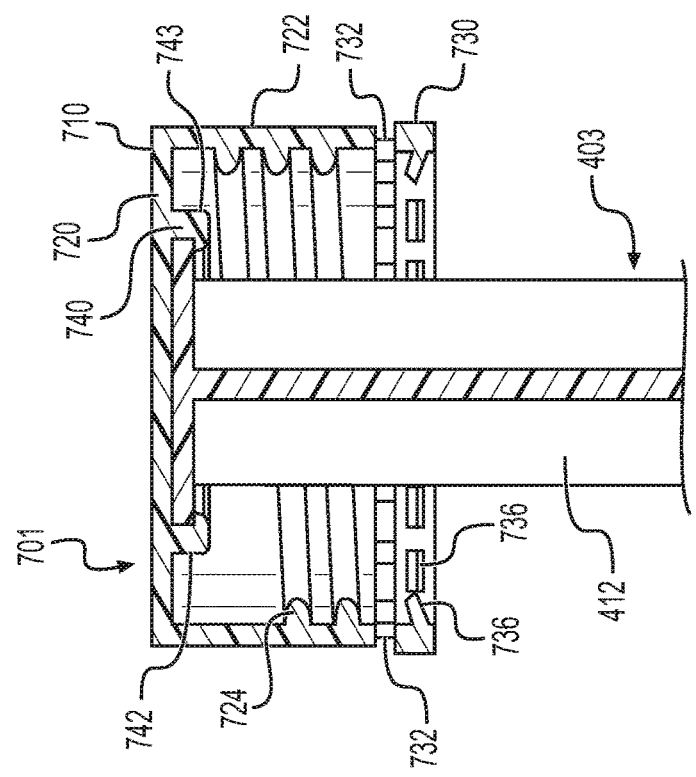

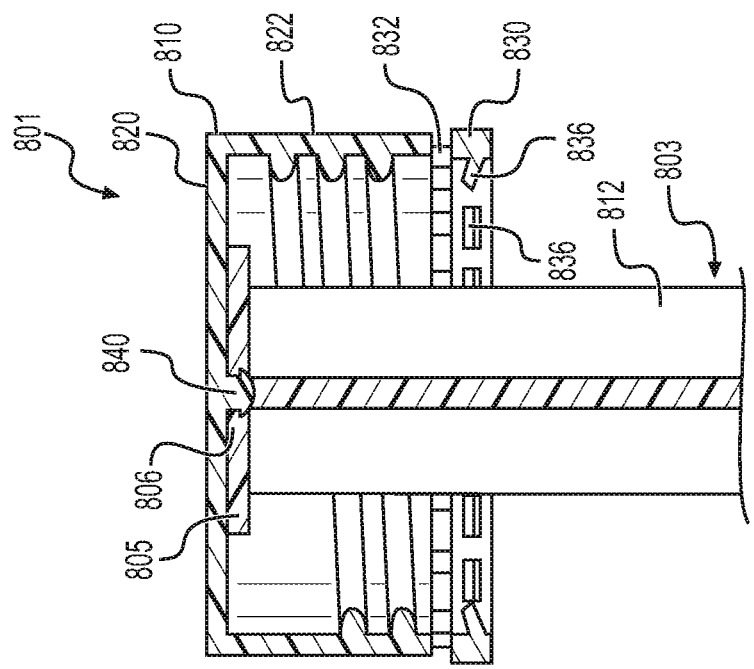
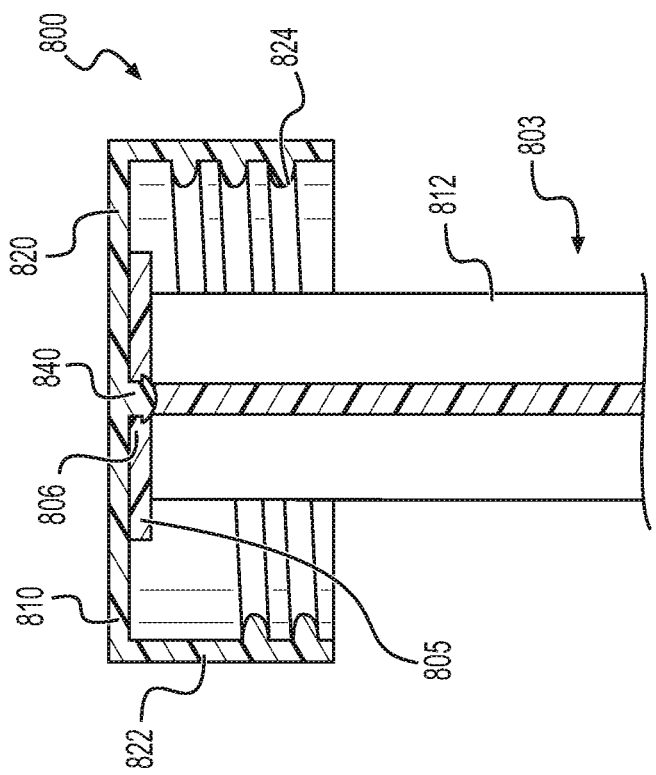

CONTAINER ASSEMBLY WITH SYRINGE

TECHNOLOGICAL FIELD

The present disclosure relates to container assemblies with syringes. More particularly, the present disclosure relates to container assemblies that include syringes removably disposed within the containers in which they are provided.

BACKGROUND

It is sometimes desirable to provide a syringe with a container holding a liquid product whereby the syringe can be used in dispensing the liquid product in a controlled and measured fashion. However, syringes typically cannot be packaged conveniently with the container holding the liquid product, leading to more difficult, costly or inconvenient configurations for combining a syringe with a liquid product container.

Accordingly, there is a need for syringe and container assemblies that can address one or more such limitations.

SUMMARY

The present disclosure encompasses a container assembly for a liquid product comprising: a container comprising a container body defining a container cavity therein and a container neck formed on the container body, wherein the container neck comprises a lip defining a container opening, wherein the container opening is in fluid communication with the container cavity, and wherein the container neck comprises a container neck minimum inner diameter and a container neck outer diameter; a syringe comprising a syringe barrel and a syringe plunger movably engaged with the syringe barrel, wherein the syringe barrel comprises a syringe barrel side wall and a syringe barrel flange extending outwardly from the syringe barrel side wall, wherein the syringe barrel side wall defines a syringe reservoir and the syringe barrel flange defines a syringe barrel opening, wherein the syringe barrel opening is in fluid communication with the syringe reservoir, wherein the syringe barrel further comprises a tip aligned distal to the syringe barrel flange, wherein the tip defines a tip opening, wherein the tip opening is in fluid communication with the syringe reservoir, wherein the syringe barrel side wall comprises a syringe barrel side wall maximum outer diameter, wherein the syringe barrel side wall maximum outer diameter is less than the container neck minimum inner diameter, wherein the syringe plunger comprises a syringe plunger seal member and a syringe plunger shaft connected to the syringe plunger seal member, wherein the syringe plunger shaft comprises a first syringe plunger shaft end and a second syringe plunger shaft end, wherein the syringe plunger seal member is connected to the syringe plunger shaft proximal to the second syringe plunger shaft end, wherein the syringe plunger seal member is movably disposed in the syringe reservoir and frictionally engages the syringe barrel side wall to form a seal; and, a closure operably connectable to the container, wherein the closure comprises a cap portion comprising an end wall and a peripheral skirt depending from the end wall, wherein the peripheral skirt comprises a peripheral skirt inner diameter, wherein the peripheral skirt inner diameter is greater than the container neck outer diameter, wherein the syringe plunger is connected to the end wall, wherein the cap portion is movable between a closed position closing the container opening and an open position opening the container opening, and wherein the syringe barrel is disposed in the container body and the syringe is enclosed by the container body and the closure in the closed position and the syringe is removable from the container in the open position.

In another aspect, the syringe plunger shaft can be integrally formed with the end wall. In a further aspect, the cap portion can comprise a syringe receiver formed on the end wall, and wherein the syringe receiver engages the syringe plunger to connect the syringe plunger to the end wall. In yet another aspect, the syringe receiver can comprise a retainer wall depending from the end wall and a retainer bead projecting from the retainer wall, and wherein the retainer bead engages the syringe plunger to connect the syringe plunger to the end wall. In still a further aspect, the syringe plunger can comprise a syringe plunger pad disposed at the first syringe plunger shaft end, wherein the retainer bead engages the syringe plunger pad to connect the syringe plunger to the end wall. In another aspect, the retainer wall and the retainer bead can be continuous. In yet another aspect, the retainer wall can comprise a plurality of retainer wall segments, wherein the retainer bead can comprise a plurality of retainer bead segments, and wherein each retainer bead segment of the plurality of retainer bead segments can be disposed on a retainer wall segment of the plurality of retainer wall segments. In still another aspect, each retainer wall segment and each retainer bead segment can be arcuate. In a further aspect, the plurality of retainer wall segments can comprise a first retainer wall segment and a second retainer wall segment. In still another aspect, the syringe receiver can comprise a bayonet depending from the end wall, wherein the bayonet engages the syringe plunger to connect the syringe plunger to the end wall. In a further aspect, the syringe plunger can comprise a bayonet receiver, and wherein the bayonet receiver engages the bayonet to connect the syringe plunger to the end wall. In yet another aspect, the cap portion can comprise an internal thread projecting inwardly from the peripheral skirt, wherein the container further comprises an external thread projecting outwardly from the container neck, and wherein the internal thread engages the external thread in the closed position. In another aspect, the container assembly can further comprise a tamper-indicating band connected to the peripheral skirt, wherein the tamper-indicating band is detachable from the peripheral skirt.

The present disclosure also encompasses a container assembly for a liquid product comprising: a container comprising a container body defining a container cavity therein and a container neck formed on the container body, wherein the container neck comprises a lip defining a container opening, an external thread projecting outwardly from the container neck, wherein the container opening is in fluid communication with the container cavity, and wherein the container neck comprises a container neck minimum inner diameter and a container neck outer diameter; a syringe comprising a syringe barrel and a syringe plunger movably engaged with the syringe barrel, wherein the syringe barrel comprises a syringe barrel side wall and a syringe barrel flange extending outwardly from the syringe barrel side wall, wherein the syringe barrel side wall defines a syringe reservoir and the syringe barrel flange defines a syringe barrel opening, wherein the syringe barrel opening is in fluid communication with the syringe reservoir, wherein the syringe barrel further comprises a tip aligned distal to the syringe barrel flange, wherein the tip defines a tip opening, wherein the tip opening is in fluid communication with the syringe reservoir, wherein the syringe barrel side wall comprises a syringe barrel side wall maximum outer diameter, wherein the syringe barrel side wall maximum outer diameter is less than the container neck minimum inner diameter, wherein the syringe plunger comprises a syringe plunger seal member and a syringe plunger shaft connected to the syringe plunger seal member, wherein the syringe plunger shaft comprises a first syringe plunger shaft end and a second syringe plunger shaft end, wherein the syringe plunger seal member is connected to the syringe plunger shaft proximal to the second syringe plunger shaft end, wherein the syringe plunger seal member is movably disposed in the syringe reservoir and frictionally engages the syringe barrel side wall to form a seal; and, a closure operably connectable to the container, wherein the closure comprises a cap portion comprising an end wall and a peripheral skirt depending from the end wall, wherein the peripheral skirt comprises an internal thread projecting inwardly, wherein the peripheral skirt comprises a peripheral skirt inner diameter, wherein the peripheral skirt inner diameter is greater than the container neck outer diameter, wherein the syringe plunger is connected to the end wall, wherein the cap portion is movable between a closed position closing the container opening and an open position opening the container opening, wherein the internal thread engages the external thread in the closed position, wherein the syringe barrel is disposed in the container body and the syringe is enclosed by the container body and the closure in the container in the closed position and the syringe is removable from the container in the open position, and wherein a portion of the syringe flange is disposed between the lip and the end wall in the closed position.

In another aspect, the syringe plunger shaft can be integrally formed with the end wall. In a further aspect, the cap portion can comprise a syringe receiver formed thereon, and wherein the syringe receiver engages the syringe plunger to connect the syringe plunger to the end wall. In yet another aspect, the syringe receiver can comprise a retainer wall depending from the end wall and a retainer bead projecting from the retainer wall, and wherein the retainer bead engages the syringe plunger to connect the syringe plunger to the end wall. In still a further aspect, the retainer wall and the retainer bead can be continuous. In another aspect, the retainer wall can comprise a plurality of retainer wall segments, wherein the retainer bead can comprise a plurality of retainer bead segments, and wherein each retainer bead segment of the plurality of retainer bead segments is disposed on a retainer wall segment of the plurality of retainer wall segments. In still another aspect, each retainer wall segment and each retainer bead segment can be arcuate. In a further aspect, the syringe receiver can comprise a bayonet depending from the end wall, and wherein the bayonet engages the syringe plunger to connect the syringe plunger to the end wall. In a further aspect, the container assembly can further comprise a tamper-indicating band connected to the peripheral skirt, wherein the tamper-indicating band is detachable from the peripheral skirt.

These and other aspects of the present disclosure are set forth in greater detail below and in the drawings for which a brief description is provided as follows.

BRIEF DESCRIPTION OF THE DRAWINGS

FIG. 1A is a cross-sectional view of a portion of the container neck of the container body, the closure, and the syringe of the container assembly shown in FIG. 1 taken along line 1A-1A, with each of the container body, the cap portion of the closure, and the syringe aligned in a closed position.

FIG. 5 is a perspective view of the syringe plunger of the syringe and the closure shown in FIG. 3 with the syringe barrel removed from the syringe plunger.

FIG. 5A is a cross-sectional view of a portion of the syringe plunger and the closure shown in FIG. 5 taken along line 5A-5A.

FIG. 6 is a perspective view of the syringe barrel of the syringe shown in FIG. 3 with the syringe plunger removed from the syringe barrel.

FIG. 6A is a cross-sectional view of a portion of the syringe barrel shown in FIG. 6.

FIG. 7 is a side elevation view of the container of the container assembly shown in FIG. 1 with the closure and syringe removed from the container.

FIG. 7A is a cross-sectional view of a portion of the container neck of the container shown in FIG. 7 taken along line 7A-7A.

FIG. 10 is a cross-sectional view of the closure shown in FIG. 8.

FIG. 11 is a cross-sectional view of the closure shown in FIG. 10 connected to the syringe plunger shown in FIG. 9.

FIG. 12 is a cross-sectional view of a portion of a syringe plunger and a closure encompassing aspects of the present disclosure.

FIG. 13 is a cross-sectional view of a portion of the syringe plunger shown in FIG. 9 connected to a cap portion of another closure encompassing aspects of the present disclosure.

FIG. 14 is a perspective view of a cap portion of still another closure that can be used in the container assemblies encompassing aspects of the present disclosure.

FIG. 15 is cross-sectional view of the cap portion of the closure shown in FIG. 14 taken along line 15-15.

FIG. 16 is a cross-sectional view of the cap portion shown in FIG. 15 with the syringe plunger shown in FIG. 9 connected thereto.

FIG. 17 is a cross-sectional view of the syringe plunger shown in FIG. 9 connected to a cap portion of still another closure encompassed by the present disclosure, with the cap portion comprising an identical syringe receiver as that formed on the cap portion of the closure shown in FIG. 16 and with a tamper-indicating band connected to the peripheral skirt of the cap portion.

FIG. 18 is a perspective view of another cap portion of a closure encompassing aspects of the present disclosure.

FIG. 19 is a cross-sectional view of the cap portion of the closure shown in FIG. 18 taken along 19-19 and with the syringe plunger shown in FIG. 9 connected to the cap portion.

FIG. 20 is a cross-sectional view of the syringe plunger shown in FIG. 9 connected to a cap portion of yet another closure encompassed by the present disclosure, with the cap portion comprising an identical syringe receiver as that formed on the cap portion of the closure shown in FIG. 19 and with a tamper-indicating band connected to the peripheral skirt of the cap portion.

FIG. 21 is a perspective view of another cap portion of a closure encompassed by the present disclosure.

FIG. 22 is a cross-sectional view of the cap portion of the closure shown in FIG. 21 taken along line 22-22 with yet another syringe plunger encompassing aspects of the present disclosure added and connected to the end wall thereof.

FIG. 23 is a cross-sectional view of the syringe plunger shown in FIG. 22 connected to a cap portion of another closure encompassed by the present disclosure, with the cap portion comprising an identical retainer as that formed on the cap portion of the closure shown in FIG. 21 and with a tamper-indicating band connected to the peripheral skirt of the cap portion.

DETAILED DESCRIPTION

The present disclosure is directed to container assemblies that comprise a syringe that are disposed within a container and connected to the end wall of the cap portion of the closure used to close the container opening of the container body, and wherein the syringe can be removable from the container when the container is in an open position. The container assemblies can be used with liquid products that can be withdrawn from the containers using the syringes disclosed.

As used herein, the singular forms of "a," "an," and "the" encompasses the plural form thereof unless otherwise indicated. As used herein, the phrase "at least one" includes all numbers of one and greater. As used herein, the term "connected" refers to the joining of one part, directly or indirectly, to another part and encompasses the formation of a unitary assembly that has the two parts formed therein, as well as the joining of two separate parts. As used herein, the term "removably connected" encompasses configurations of elements such that one element or portion thereof optionally can be connected to, disconnected from, and reconnected to another element in the normal course of use of the elements.

Figure 1:
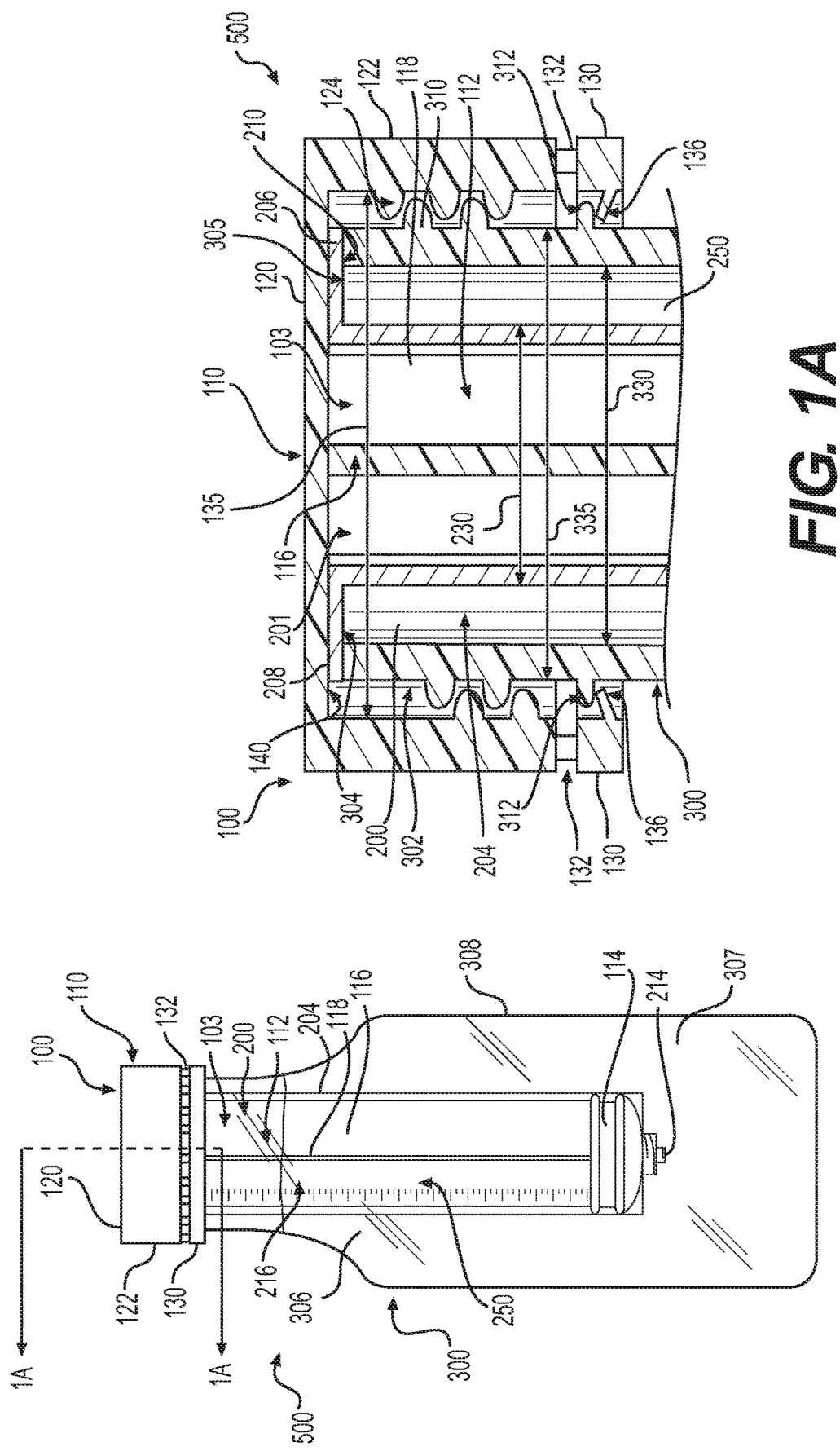
FIG. 1 is a side elevation view of a container assembly encompassing aspects of the present disclosure, wherein the container assembly comprises a container, a syringe, and a closure operably connected to the container, wherein the container contains a liquid product and the cap portion of the closure is in a closed position closing the container opening of the container body.
Figure 2:
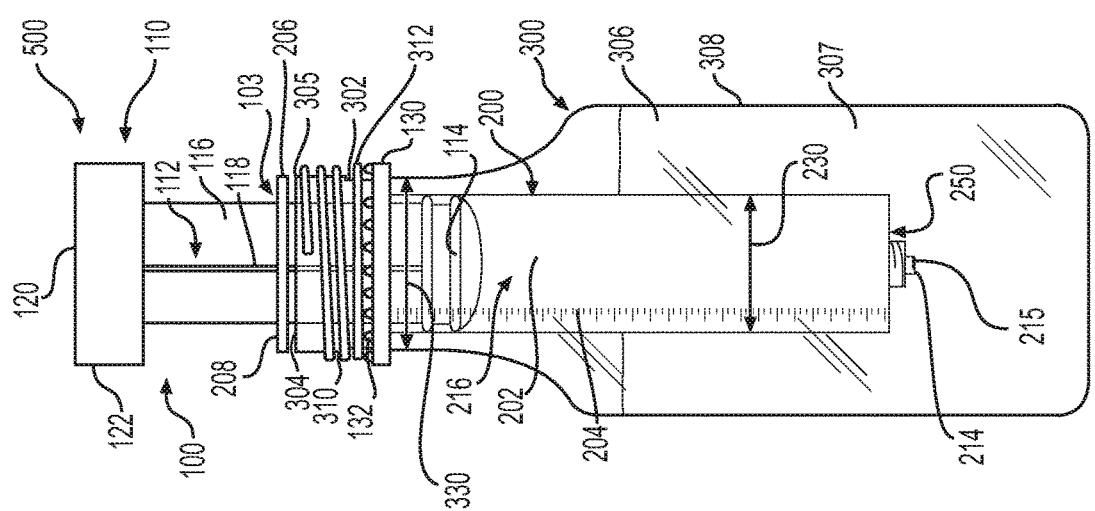
FIG. 2 is a side elevation view of the container assembly shown in FIG. 1 with the cap portion of the closure in an open position opening the container opening of the container body and removed from the container neck of the container body, the syringe removable from the container body, and the syringe plunger of the syringe raised with liquid product drawn into the syringe reservoir of the syringe from the container.

FIGS. 1-23 illustrate various aspects of the container assemblies and parts thereof encompassed by the present disclosure. FIGS. 1, 1A, and 2 illustrate a container assembly 500 encompassed by the present disclosure. The container assembly 500 comprises a container 300 in which a liquid product 307 can be shipped, sold and stored, a syringe 250 that is securely provided in and can be removed from the container 300 and used to withdraw and/or measure the liquid product 307, and a closure 100 operably connected to the container 300. At least a portion of the closure 100 is removably connected to the container 300 so that a user can remove at least a portion of the closure 100 from the container 300 to open the container 300, remove the syringe 250 from the container 300 and use the syringe 250 to withdraw and/or measure the liquid product 307, reinsert the syringe 250 into the container 300 after use, and reconnect the closure 100 to the container 300 to close the container 300 and store the remaining liquid product 307 until the next use.

The closure 100 comprises a cap portion 110. The cap portion 110 comprises an end wall 120 from which depends a peripheral skirt 122. The peripheral skirt 122 includes an internal thread 124 formed thereon and projecting inwardly therefrom. The closure 100 also can have a tamper indicating band 130 detachably connected to the cap portion 110 thereof. At the lower portion of the peripheral skirt 122 are attached a plurality of frangible bridge segments 132 that connect the tamper-indicating band 130 to the cap portion 110. The tamper-indicating band 130 comprises a plurality of arcuate bead segments 136 projecting inwardly from the tamper-indicating band 130. The cap portion 110 is movable between a closed position in which the container 300 is closed and an open position in which the container 300 is open. In the closed position, the cap portion 110 is disposed over the container neck 302 formed on the container body 308.

The syringe 250 comprises a syringe plunger 103 disposed in and movably engaged with a syringe barrel 200. The syringe plunger 103 is connected to the end wall 120 of the cap portion 110 of the closure 100 and can depend from the internal face 140 thereof. As shown in FIGS. 1A and 4A, the syringe plunger 103 is connected to the cap portion 110 by being integrally formed with the end wall 120 of the cap portion 110, thereby forming a unitary body that comprises both the syringe plunger 103 and the cap portion 110. The syringe plunger 103 comprises a syringe plunger shaft 112 and a syringe plunger seal member 114 attached thereto, as shown in FIG. 5. The syringe plunger shaft 112 comprises a first syringe plunger shaft end 201 disposed proximal to the end wall 120 and a second syringe plunger shaft end 203 disposed distal to the end wall 120. The syringe plunger shaft 112 can also include a first beam 116 and a second beam 118 aligned perpendicular to the first beam 116. The syringe plunger seal member 114 is attached to and disposed at the second syringe plunger shaft end 203 of the syringe plunger shaft 112, as shown in FIG. 5. Connection of the syringe plunger 103 to the end wall 120 of the cap portion 110 can be achieved by forming the syringe plunger shaft 112 of the syringe plunger 103 with the end wall 120 in the same mold to make the syringe plunger shaft integrally formed with the end wall 120, adhering or affixing the syringe plunger shaft 112 to the cap portion 110 or other similar means for combining two pieces into one whole component.

As shown in FIGS. 6 and 6A, the syringe barrel 200 of the syringe 250, shown in FIGS. 1 and 1A, includes a syringe barrel side wall 204 that circumscribes and defines a syringe reservoir 202. The syringe barrel 200 includes a syringe barrel opening 218 in fluid communication with the syringe reservoir 202. A syringe barrel flange 206 projecting outwardly from the syringe barrel side wall 204 defines the syringe barrel opening 218. The syringe barrel flange 206 includes a seat 208 defined on a top surface thereof and an opposed bottom face 210. The syringe barrel 200 also includes at the opposed end to the syringe barrel flange 206 an outlet 212 that is in fluid communication with both the syringe reservoir 202 and a tip 214, which defines a tip opening 215 therein. The liquid product 307, shown in FIG. 7, can be drawn into and ejected out of the tip opening 215 when the syringe 250 is used to handle the liquid product 307. The syringe barrel 200 comprises a syringe barrel side wall maximum outer diameter 230 that is less than the container neck minimum inner diameter 330, illustrated in FIGS. 1A and 7, thereby allowing for the syringe 250 to be inserted into and removed from the container neck 302.

Figure 3:
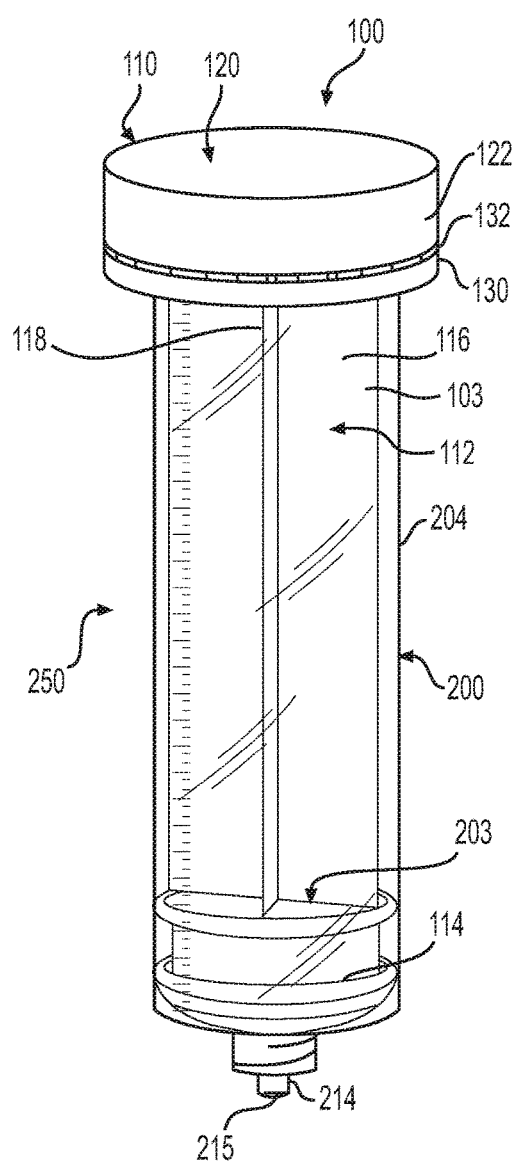
FIG. 3 is a perspective view of the syringe and closure of the container assembly shown in FIG. 1, with the syringe and closure removed from the container assembly, and the syringe plunger shaft fully extended into the syringe reservoir of the syringe barrel.
Figure 4:
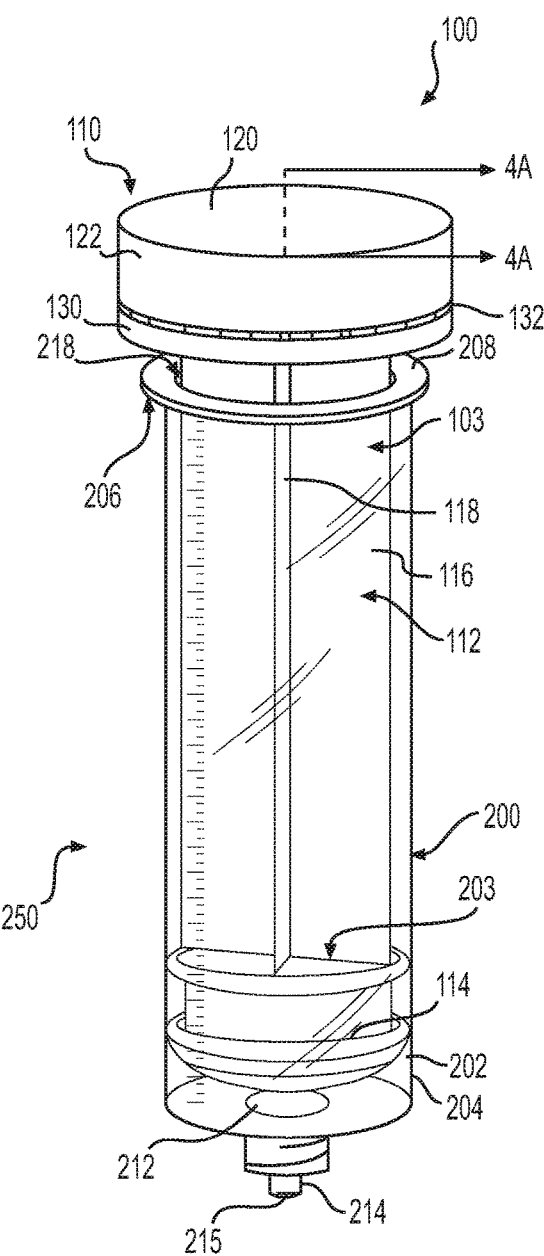
FIG. 4 is a perspective view of the syringe and closure shown in FIG. 3 with the syringe plunger partially raised and the syringe plunger seal member moved in the syringe reservoir of the syringe.
Figure 4A:
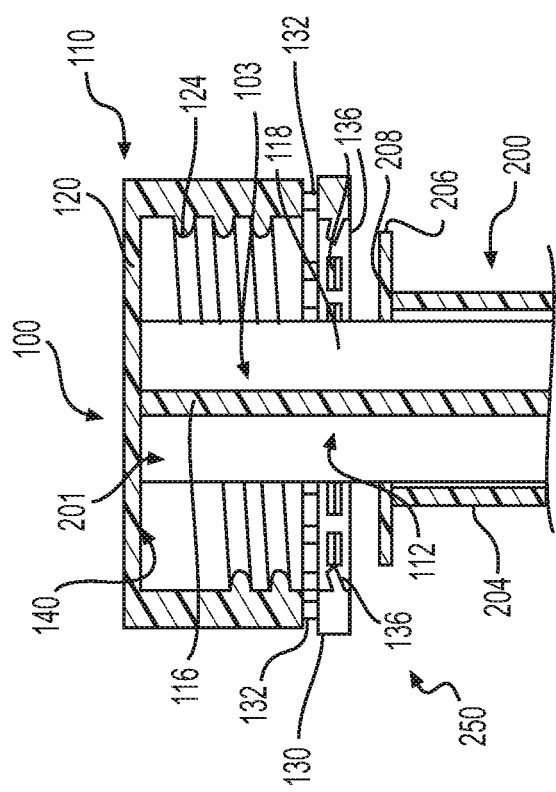
FIG. 4A is a cross-sectional view of a portion of the syringe and closure shown in FIG. 4 taken along line 4A-4A.

As shown in FIGS. 3-4A, the syringe plunger 103 is movably disposed in the syringe barrel 200 by inserting the second syringe plunger shaft end 203 into the syringe barrel opening 218 of the syringe barrel 200. The syringe plunger seal member 114 movably engages the syringe barrel side wall 204 to form a seal within the syringe 250 to allow the liquid product 307 disposed in the container 300 to be drawn upwardly therein through the tip opening 215 of the tip 214 and then ejected out through the tip 214.

As shown in FIG. 1A, the syringe barrel flange 206 is narrower than the peripheral skirt inner diameter 135 of the peripheral skirt 122 of the cap portion 110, as well as the inner diameters of the internal thread 124 and the arcuate bead segments 136, so as to allow the syringe barrel flange 206 to move upward past both the arcuate bead segments 136 and the internal thread 124 as the syringe plunger 103 moves down into the syringe reservoir 202, shown in FIG. 4, of the syringe barrel 200. As shown in FIGS. 1 and 3, the syringe plunger 103 can be fully extended into the syringe barrel 200 so that a syringe seal member 114 is disposed at or near the bottom of the syringe barrel 200. When the syringe plunger 103 is fully extended into the syringe barrel 200, the syringe barrel flange 206 can be disposed intermediate the peripheral skirt 122 of the cap portion 110.

As shown in FIGS. 7 and 7A, the container 300 comprises a container body 308 defining a container cavity 306 therein and having a container neck 302 formed on the container body 308. The container neck 302 comprises a lip 305 disposed at the top of the container neck 302 and which defines a container opening 304 that is in fluid communication with the container cavity 306. The container neck 302 has an external thread 310 formed thereon and projecting outward therefrom and disposed between the container opening 304 and a container bead 312.

In FIGS. 1A and 2, the container assembly 500 is shown with the closure 100 operably connected to the container 300 and the syringe 250 disposed in the container 300. The syringe 250 is extends downward through the container opening 304 and the container neck 302 into the container cavity 306. The syringe barrel flange 206 is wider than the container opening 304, so that at least a portion of the syringe barrel flange 206 can rest on the lip 305 of the container neck 302 when the syringe 250 is enclosed by the cap portion 110 of the closure 100 and the container 300. The cap portion 110 of the closure 100 can be threadably engaged to the container neck 302 of the container 300 by the cooperation of the internal thread 124 and the external thread 310. As shown in FIG. 1A, the peripheral skirt 122 of the cap portion 110 comprises a peripheral skirt inner diameter 135 that is greater than the container neck outer diameter 335, thereby allowing the peripheral skirt 122 to fit over the container neck 302 to close the container opening 304. When closure 100 is in the closed position, the internal thread 124 of the cap portion 110 is completely threaded on the external thread 310 on the container neck 302, at least a portion of the syringe barrel flange 206 is disposed between the internal face 140 of the end wall 120 and the lip 305 of the container neck 302 with the seat 208 facing the internal face 140 and the bottom face 210 of the syringe barrel flange 206 facing the lip 305. The syringe flange 206 thereby seals the container opening 304 so that the liquid product 307, shown in FIG. 1, cannot flow past the syringe flange 206 when the closure 100 is in the closed position.

When the cap portion 110 is initially installed on the container 300 and completely threaded on the container neck 302, the tamper-indicating band 130 and the arcuate bead segments 136 formed thereon can be forced down over the container bead 312. When the cap portion 110 is later opened and removed from the container neck 302 of the container 300, the arcuate bead segments 136 engage the container bead 312 thereby preventing the upward movement of the tamper-indicating band 130. The frangible bridge segments 132 are thin and flexible enough to fracture when the cap portion 110 is unscrewed from the container neck 302 of the container 300, thereby causing the tamper-indicating band 130 to separate from the peripheral skirt 122 and thereby indicating that the closure 100 has been opened.

As shown in FIG. 2, the syringe 250 can be used to draw and measure liquid product from the container 300. The syringe 250 can be inserted into the container opening 304 of the container neck 302 of the container 300 so that the syringe barrel 200 is disposed in the container cavity 306. The user can grasp the cap portion 110 of the closure 100 and raise it so that the syringe plunger 103, which is movably disposed in the syringe barrel 200, can be partially raised and partially removed from the syringe barrel 200, thereby drawing liquid product 307 upward into the syringe 250. The amount of liquid product 307 drawn through the tip 214 into the syringe reservoir 202 of the syringe 250 can be measured using the measurement indicia 216 disposed on the syringe barrel side wall 204. The syringe 250 then can be removed from the container cavity 306 and the liquid product 307 held in the syringe reservoir 202 can be discharged through the tip 214, as appropriate, by pushing the cap portion 110 down, thereby forcing the syringe plunger 103 to move downward into the syringe barrel 200.

Figure 8:
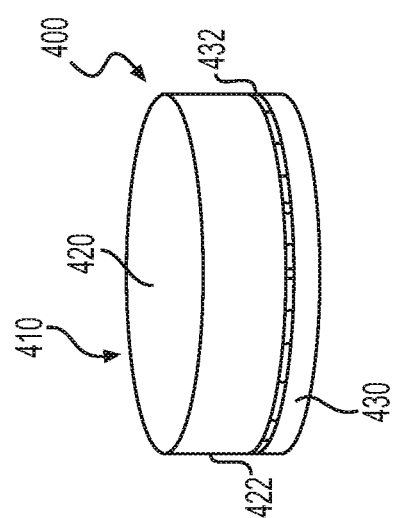
FIG. 8 is a perspective view of a closure that can be provided in the container assemblies encompassed by the present disclosure.

FIGS. 8, 10, and 11 illustrate another closure 400 that can be used in the container assemblies of the present disclosure. The closure 400 is configured to receive and connect to a syringe plunger 403 shown in FIG. 9. The closure 400 comprises a cap portion 410 and a tamper-indicating band 430 attached to the cap portion 410 by a plurality frangible bridge segments 432 depending from the peripheral skirt 422. Inwardly projecting from the peripheral skirt 422 is an internal thread 424 that is configured to cooperate with an external thread 310 formed on the container neck 302 of the container 300 to threadably secure the closure 400 to the container 300, shown in FIG. 7. As shown in FIG. 10, the tamper-indicating band 430 includes a plurality of arcuate bead segments 436 projecting inwardly from the tamper-indicating band 430. The arcuate bead segments 436 are biased upward and configured with a guide on a lower surface thereof so as to allow the bead segments 436 to moved downward past a container bead 312, shown in FIG. 7A, formed on the container neck of the container 300 when the closure 400 is initially installed on the container neck 302 of the container 300, shown in FIG. 7. Once the closure 400 is installed on the container 300, the bead segments 436 engage the container bead 312, shown in FIG. 7A, to prevent the removal of the tamper-indicating band 430 from the container 300, shown in FIG. 7.

As shown in FIGS. 10 and 11, the cap portion 410 of the closure 400 comprises syringe plunger receiver 440 formed thereon. The syringe receiver 440 comprises a retainer wall 442 axially aligned and depending from the interior surface 441 of the end wall 420 of the closure 400. Extending inwardly from the lower end of the retainer wall 442 is a retainer bead 444. A guide 446 is formed on the retainer bead 444 and comprises an upwardly sloped surface that can guide a portion of a syringe plunger 403, shown in FIG. 9, into the syringe receiver 440. The retainer wall 442, the retainer bead 444, and the guide 446 are annular and continuous in that they form a complete ring.

Figure 9:
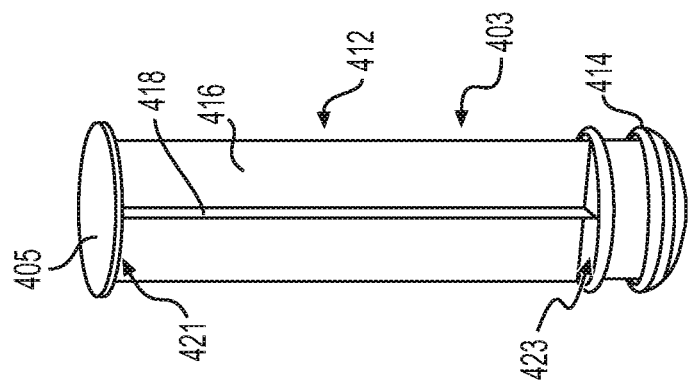
FIG. 9 is a perspective view of a syringe plunger that can be provided in the syringes of the container assemblies encompassed by the present disclosure.

As shown in FIG. 9, the syringe plunger 403 can include a pad 405 formed at the first syringe plunger shaft end 421 of the syringe plunger shaft 412 and distal to the second syringe plunger shaft end 423 at which is disposed a syringe plunger seal member 414. The syringe pad 405 is connected to a first syringe plunger beam 416 and a second syringe plunger beam 418, each of which is connected to the syringe plunger seal member 414. As shown in FIG. 11, the syringe plunger 403 can be connected to the closure 400 by inserting the pad 405 into the syringe receiver 440. The guide 446 guides the pad 405 into the syringe receiver 440 and past the flexible retainer bead 444 into the annular space circumscribed by the syringe receiver 440. The retainer bead 444 engages the pad 405 to prevent removal thereof from the closure 400. The syringe plunger 403 is thereby connected to the end wall 420 of the cap portion 410 of the closure 400. A syringe barrel 200, shown in FIG. 6, can be joined with the syringe plunger 403 to form a syringe.

FIG. 12 illustrates another closure 101 that can be used in the container assemblies of the present disclosure. The closure 101 comprises a cap portion 110 with an end wall 120 and a peripheral skirt 122 depending from the end wall 120. Unlike the closure 100, the closure 101 does not include a tamper-indicating band or the plurality of frangible bridge segments that connect a tamper-indicating band to the cap portion. The syringe plunger shaft 112 is integrally formed with the end wall 120 of the cap portion 110 of the closure 101 and is aligned intermediate of the peripheral skirt 122; the integral formation of the plunger shaft 112 with the end wall 120 thereby connects the syringe plunger 103 to the cap portion 110.

FIG. 13 illustrates yet another closure 401 that can be employed in the container assemblies of the present disclosure. The closure 401 comprises a cap portion 410 having and end wall 420 from which depends a syringe receiver 440. The syringe receiver comprises a retainer wall 442 from which extends inwardly a receiver bead 444. The syringe receiver 440 can engage and connect a syringe plunger 403 to the end wall 420 of the cap portion 410 of the closure 401. The closure 401 does not include a tamper-indicating band.

FIG. 14 illustrates another closure 600 encompassing aspects of the present disclosure. The closure 600 comprises a cap portion 610 having an end wall 620 from which depends a peripheral skirt 622. An internal thread 624 projects inwardly from the interior face of the peripheral skirt 622. A syringe receiver 640 depends from the interior face of the end wall 620. The syringe receiver 640 comprises a plurality of retainer wall segments 642. The plurality of retainer wall segments 642 comprises four retainer wall segments 644 from which a plurality of retainer bead segments 646 projects. Each retainer wall segment 644 has a retainer bead segment 645 projecting therefrom. In one aspect, each retainer bead segment 645 projects inwardly from the respective retainer wall segment 644. Each retainer wall segment 644 and each retainer bead segment 645 is arcuate. The syringe receiver 640 is annular and discontinuous in that each retainer wall segment 644 is separated from the adjacent retainer wall segments 644. As shown in FIG. 16, the syringe receiver 640 is configured to receive the pad 405 disposed on the syringe plunger 403. The plurality of retainer bead segments 645 engage and retain the pad 405 in place. Insertion of the pad 405 in the syringe receiver 640 thereby connects the syringe plunger 403 to the cap portion 610 of the closure 600.

FIG. 17 illustrates a closure 601 having a cap portion 610 as described and a tamper-indicating band 630. At the lower portion of the peripheral skirt 622 is attached a plurality of frangible bridge segments 632 that connect the tamper-indicating band 630 to the cap portion 610. The tamper-indicating band 630 comprises a plurality of arcuate bead segments 636 projecting inwardly from the tamper-indicating band 630. The cap portion 610 is movable between a closed position in which the container 300 is closed and an open position in which the container 300, shown in FIG. 7, is open.

FIGS. 18 and 19 illustrate yet another closure 700 which can be used in the container assemblies encompassed by the present disclosure. The closure 700 comprises a cap portion 710 having an end wall 720 from which depends a peripheral skirt 722. An internal thread 724 projects inwardly from the interior face of the peripheral skirt 722. A syringe receiver 740 depends from the interior face of the end wall 720. The syringe receiver 740 comprises a first retainer wall segment 742 and an opposing second retainer wall segment 743. The first retainer wall segment 742 has a first retainer bead segment 745 projecting inwardly therefrom, and the second retainer wall segment 743 has a second retainer bead segment 746 projecting inwardly therefrom. The first retainer wall segment 742, the second retainer wall segment 743, the first retainer bead segment 745, and the second retainer bead segment 746 are each arcuate. The syringe receiver 740 is annular and discontinuous in that the first retainer wall segment 742 is separated from the second retainer wall segment 743. The syringe receiver 740 is configured to receive the pad 405 disposed on the syringe plunger 403. The first retainer bead segment 745 and the second retainer bead segment 746 engage and retain the pad 405 in place. Insertion of the pad 405 in the syringe receiver 740 thereby connects the syringe plunger 403 to the cap portion 710 of the closure 700.

FIG. 20 shows yet another closure 701 having a cap portion 710 as described with a tamper-indicating band 730 connected thereto. At the lower portion of the peripheral skirt 722 is attached a plurality of frangible bridge segments 732 that connect the tamper-indicating band 730 to the cap portion 710. The tamper-indicating band 730 comprises a plurality of arcuate bead segments 736 projecting inwardly from the tamper-indicating band 730.

FIGS. 21 and 22 illustrate still a further closure 800 that can be used in the container assemblies of the present disclosure. The closure 800 comprises a cap portion 810 having an end wall 820 from which depends a peripheral skirt 822. An internal thread 824 projects inwardly from the interior face of the peripheral skirt 822. A syringe receiver 840 depends from the interior face of the end wall 820. The syringe receiver 840 comprises a bayonet 842 attached to the end wall 820 and projecting downwardly therefrom. The bayonet 842 has a bayonet head 844 at the end thereof and disposed distal from the end wall 820. The bayonet head 844 has a base with a diameter that is greater than the diameter of the base of the bayonet 842 and a tip that is less than the diameter of the base thereof. As shown in FIG. 22, the syringe receiver 840 is configured to engage the pad 805 formed on the syringe plunger 812. The pad 805 defines a bayonet receiver 806 that comprises a recess formed in the pad 805 sized and contoured to receive and engage the syringe receiver 840. The syringe plunger 812 can be connected to the end wall 820 of the cap portion 810 by inserting the bayonet head 844 and at least a portion of the bayonet 842 into the bayonet receiver 806 formed in the pad 805. The bayonet receiver 806 includes a retention bead formed therein that is configured with a diameter less than the diameter of the base of the bayonet head 844 to allow the bayonet head 844 to be inserted past the retention bead and be retained thereby in place within the bayonet receiver 806.

FIG. 23 shows yet another closure 801 having a cap portion 810 as described with a tamper-indicating band 830 connected thereto. At the lower portion of the peripheral skirt 822 is attached a plurality of frangible bridge segments 832 that connect the tamper-indicating band 830 to the cap portion 810. The tamper-indicating band 830 comprises a plurality of arcuate bead segments 836 projecting inwardly from the tamper-indicating band 830.

The closures 100, 400, 101, 401, 600, 601, 700, 701, 800, and 801 can be used with the container 300 and the syringe 250 described herein in the container assemblies 500 of the present disclosure. The syringe 250 of the present disclosure can comprise the syringe barrel 200 operably connected to any one of the syringe plungers 103, 403 and 803, with the respective syringe shafts 112, 412, or 812 connected to one of the end walls 120, 420, 620, 720, or 820 of one of the cap portions 110, 410, 610, 710, or 810 of one of the closures 100, 400, 101, 401, 600, 601, 700, 701, 800, and 801. The syringe 250 is configured to be enclosed by the container body 308 and the cap portion 110, 410, 610, 710, or 810 of the selected closure 100, 400, 101, 401, 600, 601, 700, 701, 800, or 801, when the container assembly 500 is in the closed position with the cap portion 110, 410, 610, 710, or 810 in a closed position covering the container opening 304 of the container body 308. The syringe barrel flange 206 rests upon the lip 305 of the container neck 302 and contacts the end wall 120, 420, 620, 720, or 820 of one of the cap portions 110, 410, 610, 710, or 810 of one of the closures 100, 400, 101, 401, 600, 601, 700, 701, 800, or 801 to form a seal to prevent leakage of the liquid product 307 from the container 300 when the container 300 is closed. When the cap portion 110, 410, 610, 710, or 810 of the respective closure 100, 400, 101, 401, 600, 601, 700, 701, 800, or 801 is removed from the container body 308, thereby placing the container opening 304 of the container 300 in an open position, the syringe 250 can be removed from the container cavity 306 and used to withdraw the liquid contents 307 of the container 300. If the connection of the syringe shaft to the cap portion is configured to allow for the detachment and reattachment of the syringe shaft to the end wall of the cap portion, then the cap portion can be removed from the syringe and the syringe can be used. The syringe shaft can be reattached to the end wall of the cap portion and inserted into the container cavity of the container body and the cap portion placed over the neck of the container body and threaded into place to align the container assembly into a closed position again. If the syringe shaft is not configured to be detachably connected to the end wall of the cap portion of the closure, then the syringe can be used in conjunction with the cap portion to withdraw and/or measure liquid product from the container. If the syringe is connected to the cap portions described herein by connection of the syringe shaft to end wall of the cap portion.

The components of the container assemblies encompassed by the present disclosure can be constructed of thermoplastic, metal, glass, and/or other materials known in the art and fabricated by methods known in the art.

The embodiments set forth herein are provided to illustrate the scope of the present disclosure, but are not provided to limit the scope thereof. The present disclosure contemplates alternative combinations and modifications of the features disclosed herein without departing from the scope thereof. Alternatives, variations and modifications of the embodiments described herein will be apparent to one of ordinary skill in the art and are encompassed by the present disclosure.

The invention claimed is:

1. A container assembly for a liquid product comprising:
a container comprising a container body defining a container cavity therein and a container neck formed on the container body, wherein the container neck comprises a lip defining a container opening, wherein the container opening is in fluid communication with the container cavity, and wherein the container neck comprises a container neck minimum inner diameter and a container neck outer diameter;
a syringe comprising a syringe barrel and a syringe plunger movably engaged with the syringe barrel, wherein the syringe barrel comprises a syringe barrel side wall and a syringe barrel flange extending outwardly from the syringe barrel side wall, wherein the syringe barrel side wall defines a syringe reservoir and the syringe barrel flange defines a syringe barrel opening, wherein the syringe barrel opening is in fluid communication with the syringe reservoir, wherein the syringe barrel further comprises a tip aligned distal to the syringe barrel flange, wherein the tip defines a tip opening, wherein the tip opening is in fluid communication with the syringe reservoir, wherein the syringe barrel side wall comprises a syringe barrel side wall maximum outer diameter, wherein the syringe barrel side wall maximum outer diameter is less than the container neck minimum inner diameter, wherein the syringe plunger comprises a syringe plunger seal member and a syringe plunger shaft connected to the syringe plunger seal member, wherein the syringe plunger shaft comprises a first syringe plunger shaft end and a second syringe plunger shaft end, wherein the syringe plunger seal member is connected to the syringe plunger shaft proximal to the second syringe plunger shaft end, wherein the syringe plunger seal member is movably disposed in the syringe reservoir and frictionally engages the syringe barrel side wall to form a seal; and,
a closure operably connectable to the container, wherein the closure comprises a cap portion comprising an end wall and a peripheral skirt depending directly from the end wall, wherein the peripheral skirt comprises a peripheral skirt inner diameter, wherein the peripheral skirt inner diameter is greater than the container neck outer diameter, wherein the syringe plunger is connected to the end wall, wherein the syringe plunger is movable with the cap portion, wherein the cap portion is movable between a closed position closing the container opening and an open position opening the container opening, wherein the cap portion directly engages the container neck in the closed position, and wherein the syringe barrel is disposed in the container body and the syringe is enclosed by the container body and the closure in the container in the closed position and the syringe is removable from the container in the open position.

2. The container assembly of claim 1, wherein the syringe plunger shaft is integrally formed with the end wall.

3. The container assembly of claim 1, wherein the cap portion comprises a syringe receiver formed thereon, and wherein the syringe receiver engages the syringe plunger to connect the syringe plunger to the end wall.

4. The container assembly of claim 3, wherein the syringe receiver comprises a retainer wall depending from the end wall and a retainer bead projecting from the retainer wall, and wherein the retainer bead engages the syringe plunger to connect the syringe plunger to the end wall.

5. The container assembly of claim 4, wherein the syringe plunger comprises a syringe plunger pad disposed at the first syringe plunger shaft end, wherein the retainer bead engages the syringe plunger pad to connect the syringe plunger to the end wall.

6. The container assembly of claim 4, wherein the retainer wall and the retainer bead are continuous.

7. The container assembly of claim 4, wherein the retainer wall comprises a plurality of retainer wall segments, wherein the retainer bead comprises a plurality of retainer bead segments, and wherein each retainer bead segment of the plurality of retainer bead segments is disposed on a retainer wall segment of the plurality of retainer wall segments.

8. The container assembly of claim 7, wherein each retainer wall segment and each retainer bead segment is arcuate.

9. The container assembly of claim 8, wherein the plurality of retainer wall segments comprises a first retainer wall segment and a second retainer wall segment.

10. The container assembly of claim 3, wherein the syringe receiver comprises a bayonet depending from the end wall, wherein the bayonet engages the syringe plunger to connect the syringe plunger to the end wall.

11. The container assembly of claim 10, wherein the syringe plunger comprises a bayonet receiver, and wherein the bayonet receiver engages the bayonet to connect the syringe plunger to the end wall.

12. The container assembly of claim 1, wherein the cap portion further comprises an internal thread projecting inwardly from the peripheral skirt, wherein the container further comprises an external thread projecting outwardly from the container neck, and wherein the internal thread engages the external thread in the closed position.

13. The container assembly of claim 1, further comprising a tamper-indicating band connected to the peripheral skirt, wherein the tamper-indicating band is detachable from the peripheral skirt.

14. A container assembly for a liquid product comprising:
a container comprising a container body defining a container cavity therein and a container neck formed on the container body, wherein the container neck comprises a lip defining a container opening, an external thread projecting outwardly from the container neck, wherein the container opening is in fluid communication with the container cavity, and wherein the container neck comprises a container neck minimum inner diameter and a container neck outer diameter;
a syringe comprising a syringe barrel and a syringe plunger movably engaged with the syringe barrel, wherein the syringe barrel comprises a syringe barrel side wall and a syringe barrel flange extending outwardly from the syringe barrel side wall, wherein the syringe barrel side wall defines a syringe reservoir and the syringe barrel flange defines a syringe barrel opening, wherein the syringe barrel opening is in fluid communication with the syringe reservoir, wherein the syringe barrel further comprises a tip aligned distal to the syringe barrel flange, wherein the tip defines a tip opening, wherein the tip opening is in fluid communication with the syringe reservoir, wherein the syringe barrel side wall comprises a syringe barrel side wall maximum outer diameter, wherein the syringe barrel side wall maximum outer diameter is less than the container neck minimum inner diameter, wherein the syringe plunger comprises a syringe plunger seal member and a syringe plunger shaft connected to the syringe plunger seal member, wherein the syringe plunger shaft comprises a first syringe plunger shaft end and a second syringe plunger shaft end, wherein the syringe plunger seal member is connected to the syringe plunger shaft proximal to the second syringe plunger shaft end, wherein the syringe plunger seal member is movably disposed in the syringe reservoir and frictionally engages the syringe barrel side wall to form a seal; and,
a closure operably connectable to the container, wherein the closure comprises a cap portion comprising an end wall and a peripheral skirt depending directly from the end wall, wherein the peripheral skirt comprises an internal thread projecting inwardly, wherein the peripheral skirt comprises a peripheral skirt inner diameter, wherein the peripheral skirt inner diameter is greater than the container neck outer diameter, wherein the syringe plunger is connected to the end wall, wherein the syringe plunger is movable with the cap portion, wherein the cap portion is movable between a closed position closing the container opening and an open position opening the container opening, wherein the internal thread engages the external thread in the closed position, wherein the syringe barrel is disposed in the container body and the syringe is enclosed by the container body and the closure in the container in the closed position and the syringe is removable from the container in the open position, and wherein a portion of the syringe flange is disposed between the lip and the end wall in the closed position.

15. The container assembly of claim 14, wherein the syringe plunger shaft is integrally formed with the end wall.

16. The container assembly of claim 14, wherein the cap portion comprises a syringe receiver formed thereon, and wherein the syringe receiver engages the syringe plunger to connect the syringe plunger to the end wall.

17. The container assembly of claim 16, wherein the syringe receiver comprises a retainer wall depending from the end wall and a retainer bead projecting from the retainer wall, and wherein the retainer bead engages the syringe plunger to connect the syringe plunger to the end wall.

18. The container assembly of claim 17, wherein the retainer wall and the retainer bead are continuous.

19. The container assembly of claim 17, wherein the retainer wall comprises a plurality of retainer wall segments, wherein the retainer bead comprises a plurality of retainer bead segments, wherein each retainer bead segment of the plurality of retainer bead segments is disposed on a retainer wall segment of the plurality of retainer wall segments.

20. The container assembly of claim 19, wherein each retainer wall segment and each retainer bead segment is arcuate.

21. The container assembly of claim 16, wherein the syringe receiver comprises a bayonet depending from the end wall, and wherein the bayonet engages the syringe plunger to connect the syringe plunger to the end wall.

22. The container assembly of claim 14, further comprising a tamper-indicating band connected to the peripheral skirt, wherein the tamper-indicating band is detachable from the peripheral skirt.

* * * * *